US008875828B2

(12) United States Patent
Rawlinson et al.

(10) Patent No.: US 8,875,828 B2
(45) Date of Patent: Nov. 4, 2014

(54) VEHICLE BATTERY PACK THERMAL BARRIER

(71) Applicant: Tesla Motors, Inc., Palo Alto, CA (US)

(72) Inventors: Peter Dore Rawlinson, Worcestershire (GB); Nicholas Hayden Herron, Burlingame, CA (US); Bruce Phillip Edwards, Menlo Park, CA (US); Gregory Michael Goetchius, Mountain View, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 38 days.

(21) Appl. No.: 13/771,471

(22) Filed: Feb. 20, 2013

(65) Prior Publication Data

US 2013/0153317 A1 Jun. 20, 2013

Related U.S. Application Data

(63) Continuation-in-part of application No. 13/311,343, filed on Dec. 5, 2011.

(60) Provisional application No. 61/426,254, filed on Dec. 22, 2010.

(51) Int. Cl.
    *B60R 16/04* (2006.01)
    *B62D 25/20* (2006.01)
    *B60K 1/04* (2006.01)
    *F41H 7/04* (2006.01)
    *B62D 25/02* (2006.01)
    *B62D 29/00* (2006.01)

(52) U.S. Cl.
    CPC .............. *B60K 1/04* (2013.01); *B62D 25/2036* (2013.01); *F41H 7/042* (2013.01); *B62D 25/025* (2013.01); *B62D 29/008* (2013.01)
    USPC .......................................................... 180/68.5

(58) Field of Classification Search
    USPC ................................................. 180/65.1, 68.5
    See application file for complete search history.

(56) References Cited

U.S. PATENT DOCUMENTS 4,174,014 A    11/1979  Bjorksten
4,216,839 A *   8/1980  Gould et al. ................. 180/65.1

(Continued)

FOREIGN PATENT DOCUMENTS

JP       10252466      9/1998
JP       2004-257000   9/2004

(Continued)

*Primary Examiner* — Hau Phan
*Assistant Examiner* — Jacob Meyer
(74) *Attorney, Agent, or Firm* — J. Richard Soderberg (57) ABSTRACT

An integration assembly for a battery pack mounted between the passenger cabin floor panel of an electric vehicle and the driving surface is provided, the assembly utilizing a multi-layer thermal barrier interposed between the battery pack enclosure and the passenger cabin floor panel, where the multi-layer thermal barrier provides noise isolation, thermal isolation and vibration damping, and where the multi-layer thermal barrier is compressed when the battery pack enclosure is mounted to the vehicle. The multi-layer thermal barrier is comprised of a first layer formed from a compressible and conformable elastic material and a second layer formed from a conformable thermally insulating material. The multi-layer thermal barrier may also include a moisture barrier layer that encases the first and second layers, for example a moisture barrier layer fabricated from a plastic. A sealant may be used to seal and bond the moisture barrier layer to the battery pack enclosure.

20 Claims, 12 Drawing Sheets

(56) References Cited

U.S. PATENT DOCUMENTS

| | | |
|---|---|---|
| 4,336,644 A | 6/1982 | Medlin |
| 4,352,316 A | 10/1982 | Medlin |
| 5,086,860 A | 2/1992 | Francis et al. |
| 5,114,807 A * | 5/1992 | Rowlette ................... 429/152 |
| 5,305,513 A | 4/1994 | Lucid et al. |
| 5,338,080 A * | 8/1994 | Janotik et al. ................ 296/29 |
| 5,378,555 A * | 1/1995 | Waters et al. ................ 429/97 |
| 5,392,873 A * | 2/1995 | Masuyama et al. ......... 180/68.5 |
| 5,501,289 A * | 3/1996 | Nishikawa et al. ......... 180/68.5 |
| 5,534,364 A | 7/1996 | Watanabe et al. |
| 5,620,057 A | 4/1997 | Klemen et al. |
| 5,639,571 A | 6/1997 | Waters et al. |
| 5,681,668 A | 10/1997 | Reed et al. |
| 6,094,927 A | 8/2000 | Anazawa et al. |
| 6,224,998 B1 | 5/2001 | Brouns et al. |
| 6,227,322 B1 | 5/2001 | Nishikawa |
| 6,250,410 B1 * | 6/2001 | Balestrini et al. ......... 180/65.51 |
| 6,547,020 B2 | 4/2003 | Maus et al. |
| 6,632,560 B1 | 10/2003 | Zhou et al. |
| 6,662,891 B2 | 12/2003 | Misu et al. |
| 6,676,200 B1 | 1/2004 | Peng |
| 6,709,047 B2 * | 3/2004 | Burge .......................... 296/209 |
| 6,793,274 B2 | 9/2004 | Riley et al. |
| 7,090,293 B2 | 8/2006 | Saberan et al. |
| 7,353,900 B2 * | 4/2008 | Abe et al. ................... 180/68.5 |
| 7,427,093 B2 | 9/2008 | Watanabe et al. |
| 7,654,352 B2 | 2/2010 | Takasaki et al. |
| 7,717,207 B2 | 5/2010 | Watanabe et al. |
| 7,770,525 B2 | 8/2010 | Kumar et al. |
| 7,823,672 B2 | 11/2010 | Watanabe et al. |
| 7,926,602 B2 * | 4/2011 | Takasaki ..................... 180/68.5 |
| 7,931,105 B2 * | 4/2011 | Sato et al. .................. 180/68.5 |
| 7,997,368 B2 * | 8/2011 | Takasaki et al. ............ 180/68.5 |
| 8,007,032 B1 | 8/2011 | Craig |
| 8,012,620 B2 * | 9/2011 | Takasaki et al. ............. 429/100 |
| 8,037,960 B2 | 10/2011 | Kiya |
| 8,091,669 B2 | 1/2012 | Taneda et al. |
| 8,210,301 B2 * | 7/2012 | Hashimoto et al. ......... 180/68.5 |
| 8,276,697 B2 * | 10/2012 | Takasaki ..................... 180/68.5 |
| 8,318,372 B2 * | 11/2012 | Saito ........................... 429/469 |
| 8,403,090 B2 * | 3/2013 | Fujiwara et al. ............ 180/68.5 |
| 8,464,817 B2 * | 6/2013 | Usami et al. ................ 180/68.5 |
| 2001/0030069 A1 | 10/2001 | Misu et al. |
| 2002/0162696 A1 | 11/2002 | Maus et al. |
| 2004/0012230 A1 * | 1/2004 | Burge .......................... 296/209 |
| 2004/0016580 A1 | 1/2004 | Kronner et al. |
| 2006/0005695 A1 | 1/2006 | Honlinger et al. |
| 2006/0060402 A1 * | 3/2006 | Abe et al. ................... 180/68.5 |
| 2008/0160394 A1 * | 7/2008 | Takasaki et al. ............... 429/96 |
| 2008/0173488 A1 * | 7/2008 | Takasaki ..................... 180/68.5 |
| 2008/0173489 A1 * | 7/2008 | Takasaki ..................... 180/68.5 |
| 2008/0190679 A1 * | 8/2008 | Sato et al. ................... 180/68.5 |
| 2008/0196957 A1 * | 8/2008 | Koike et al. ................. 180/68.5 |
| 2009/0021052 A1 | 1/2009 | Kato |
| 2009/0186266 A1 | 7/2009 | Nishino et al. |
| 2009/0226806 A1 * | 9/2009 | Kiya ............................ 429/186 |
| 2009/0242299 A1 | 10/2009 | Takasaki et al. |
| 2010/0025132 A1 | 2/2010 | Hill et al. |
| 2010/0170735 A1 * | 7/2010 | Nakamura et al. .......... 180/68.5 |
| 2010/0175940 A1 | 7/2010 | Taneda et al. |
| 2010/0236763 A1 * | 9/2010 | Torok ........................... 165/121 |
| 2010/0273040 A1 | 10/2010 | Kubota et al. |
| 2010/0289295 A1 | 11/2010 | Yoda et al. |
| 2010/0307848 A1 | 12/2010 | Hashimoto et al. |
| 2011/0297467 A1 * | 12/2011 | Iwasa et al. ............... 180/65.31 |
| 2011/0297469 A1 * | 12/2011 | Usami et al. ................ 180/68.5 |
| 2011/0300427 A1 | 12/2011 | Iwasa et al. |
| 2012/0021301 A1 | 1/2012 | Ohashi |
| 2012/0028135 A1 | 2/2012 | Ohashi |
| 2012/0073888 A1 | 3/2012 | Taneda et al. |
| 2012/0103714 A1 | 5/2012 | Choi et al. |
| 2012/0153682 A1 * | 6/2012 | Rawlinson et al. ........... 296/209 |
| 2012/0156539 A1 | 6/2012 | Honjo et al. |
| 2012/0161429 A1 | 6/2012 | Rawlinson et al. |
| 2012/0161472 A1 | 6/2012 | Rawlinson et al. |
| 2012/0223113 A1 * | 9/2012 | Gaisne et al. ................. 224/538 |
| 2012/0247107 A1 * | 10/2012 | Balk et al. ...................... 60/718 |
| 2012/0312597 A1 * | 12/2012 | Toyama et al. ............. 174/84 C |
| 2013/0149582 A1 * | 6/2013 | Kimura et al. ............... 429/120 |
| 2013/0171487 A1 * | 7/2013 | Bull et al. ...................... 429/99 |

FOREIGN PATENT DOCUMENTS

| | | |
|---|---|---|
| JP | 2004-262413 | 9/2004 |
| JP | 2007055405 A * | 3/2007 |
| JP | 2008-074148 | 4/2008 |
| JP | 2009-193942 | 8/2009 |
| WO | WO 2012063393 | 5/2012 |

\* cited by examiner

VEHICLE BATTERY PACK THERMAL BARRIER

CROSS-REFERENCE TO RELATED APPLICATION

The present application is a continuation-in-part of U.S. patent application Ser. No. 13/311,343, filed 5 Dec. 2011, and claims benefit of the filing date of U.S. Provisional Patent Application Ser. No. 61/426,254, filed 22 Dec. 2010, the disclosures of which are incorporated herein by reference for any and all purposes.

FIELD OF THE INVENTION

The present invention relates generally to vehicle structures and, more particularly, to means for isolating the battery pack of an electric vehicle from the passenger compartment.

BACKGROUND OF THE INVENTION

A large percentage of the world's vehicles run on gasoline using an internal combustion engine. The use of such vehicles, more specifically the use of vehicles which rely on fossil fuels, e.g., gasoline, creates two problems. First, due to the finite size and limited regional availability of such fuels, major price fluctuations and a generally upward pricing trend in the cost of gasoline are common, both of which can have a dramatic impact at the consumer level. Second, fossil fuel combustion is one of the primary sources of carbon dioxide, a greenhouse gas, and thus one of the leading contributors to global warming. Accordingly, considerable effort has been spent on finding alternative drive systems for use in both personal and commercial vehicles.

Electric vehicles, due to their cleaner and more efficient drive systems, offer one of the most promising alternatives to vehicles that use internal combustion drive trains. To be successful, however, an electric vehicle must meet consumers' expectations relative to performance, range, reliability, lifetime and cost. These expectations, in turn, place considerable importance on the design, configuration and implementation of the electric vehicle's rechargeable batteries.

In a typical electric vehicle, either an all-electric or hybrid vehicle, the battery pack is mounted to the vehicle's floor in a location intended to be as unobtrusive as possible. For example, in U.S. Pat. No. 7,427,093, issued 23 Sep. 2008, the battery pack is mounted to the vehicle floor panel, under the front seat. The disclosed system includes a protective member, for example attached to the battery pack itself, which is shaped and positioned to protect the battery pack and the wiring harness from possible damage by passengers in the rear seat.

U.S. Pat. No. 7,717,207, issued 18 May 2010, discloses an alternate battery pack mounting structure that is intended to minimize battery pack damage in the event of a vehicle collision. As disclosed, the battery pack is mounted to the rear portion of the vehicle frame, the frame including a deformable portion that deforms in an up-down direction when an impact load is applied in a longitudinal direction. The battery pack is fixed to the frame in such a way that it will move relative to the deformable portion when the deformable portion deforms under load, thus minimizing the transfer of load energy to the battery pack and allowing the shape of the pack to be maintained during a collision.

U.S. Pat. No. 8,037,960, issued 18 Oct. 2011, discloses an alternate battery mounting structure designed to minimize battery pack damage in the event of a vehicle collision. As disclosed, the battery pack structure is mounted to the rear side of the rear vehicle seats using bolts/screws that are designed to break and allow the battery pack to detach and move when the vehicle is in a collision.

Although the prior art teaches a variety of techniques for mounting large battery packs within an electric vehicle, what is needed is a battery mounting system that allows the battery pack to be fully integrated into the vehicle in such a way as to take advantage of the pack's rigidity and strength, while minimizing the effects of the battery pack on vehicle occupant comfort and safety. The present invention provides such a system.

SUMMARY OF THE INVENTION

The present invention provides a vehicle battery pack integrated assembly, the assembly utilizing a battery pack enclosure that includes an enclosure top panel, an enclosure bottom panel, and a plurality of enclosure side members, where the battery pack enclosure is configured to hold a plurality of batteries, and where the battery pack is mounted between the passenger cabin floor panel and the driving surface. The system assembly includes a multi-layer thermal barrier interposed between the battery pack enclosure and the passenger cabin floor panel, where the multi-layer thermal barrier provides noise isolation, thermal isolation and vibration damping, where the multi-layer thermal barrier is compressed when the battery pack enclosure is mounted to the vehicle, and where the multi-layer thermal barrier is comprised of a first layer formed from a compressible and conformable elastic material and a second layer formed from a conformable thermally insulating material. A waterproof seal may be interposed between the battery pack enclosure and the vehicle, thus sealing the multi-layer thermal barrier between the battery pack enclosure and the passenger cabin floor. The multi-layer thermal barrier may also include a moisture barrier layer that encases the first and second layers, for example a moisture barrier layer fabricated from a plastic such as a low-density polyethylene (LDPE) thermoplastic. A sealant may be used to seal and bond the moisture barrier layer to the battery pack enclosure.

In another aspect of the invention, the multi-layer thermal barrier may have an acoustic insertion loss of greater than 10 dB for frequencies between 1000 Hz and 10 kHz; alternately, the multi-layer thermal barrier may have an acoustic insertion loss of greater than 20 dB for frequencies between 1000 Hz and 10 kHz.

In another aspect of the invention, the multi-layer thermal barrier may have a damping loss factor of at least 0.1; alternately, the multi-layer thermal barrier may have a damping loss factor of at least 0.3.

In another aspect of the invention, the second layer of the multi-layer thermal barrier may have a thermal conductivity of less than 0.25 W/m-K at a temperature of 1000° C.; alternately, the second layer of the multi-layer thermal barrier may have a thermal conductivity of less than 0.15 W/m-K at a temperature of 1000° C.; alternately, the second layer of the multi-layer thermal barrier may have a thermal conductivity of less than 0.1 W/m-K at a temperature of 1000° C.

In another aspect of the invention, the second layer of the multi-layer thermal barrier may be capable of withstanding temperatures of more than 1000° C. continuously; alternately, the second layer of the multi-layer thermal barrier may be capable of withstanding temperatures of more than 1000° C. for a period of at least 10 seconds.

In another aspect of the invention, the first and/or second layer of the multi-layer thermal barrier may have a compression modulus of at least 1.5 PSI at 25% compression.

In another aspect of the invention, the first layer of the multi-layer thermal barrier may be comprised of a closed cell foam material such as a closed cell foam consisting of polyurethane, polyethylene, or ethylene propylene diene monomer (EPDM) foam.

In another aspect of the invention, the second layer of the multi-layer thermal barrier may be comprised of silica/calcium oxide fibers, silica/calcium oxide/magnesium oxide fibers, a basalt fiber based needled pad, silica/silica fibers, alumina, Kevlar® or Nomex®.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different battery types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within an enclosure, the individual batteries electrically interconnected to achieve the desired voltage and capacity for a particular application. As such, the terms "battery pack" and "battery pack enclosure" may be used interchangeably herein. The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle refers to a vehicle utilizing multiple propulsion sources one of which is an electric drive system.

Figure 1:
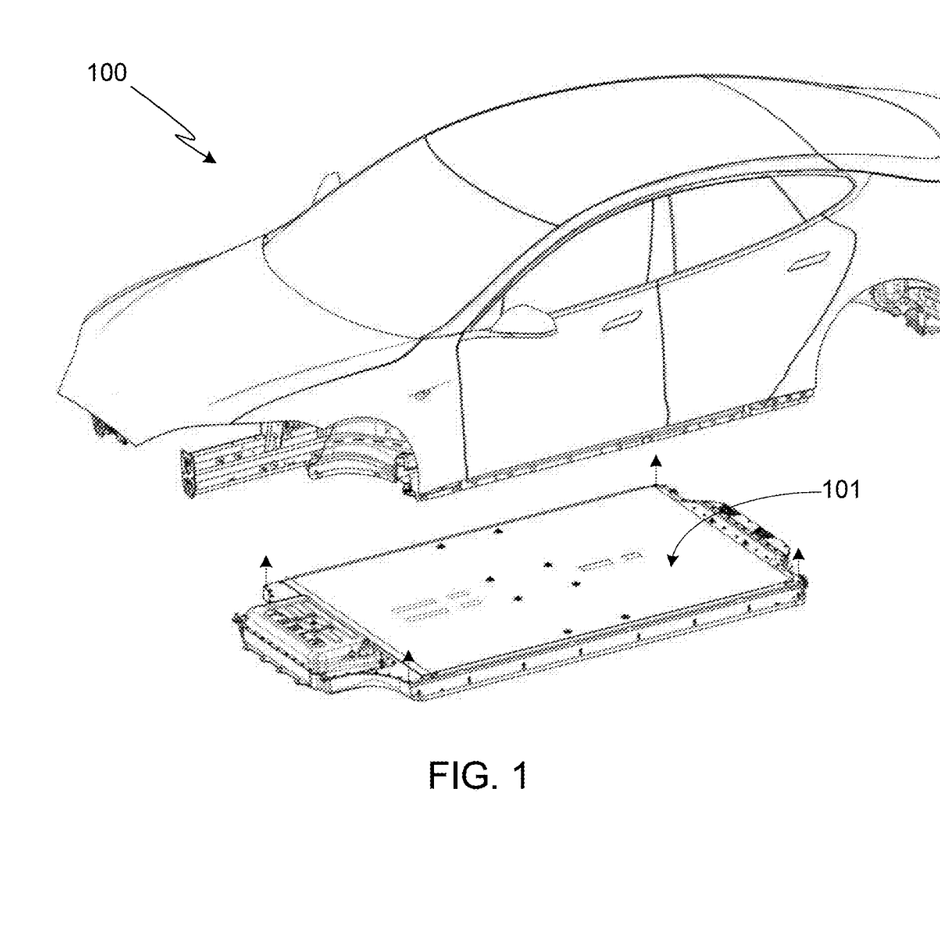
FIG. 1 provides a perspective view of a portion of a vehicle body and frame with the battery pack separated from the structure.
Figure 2:
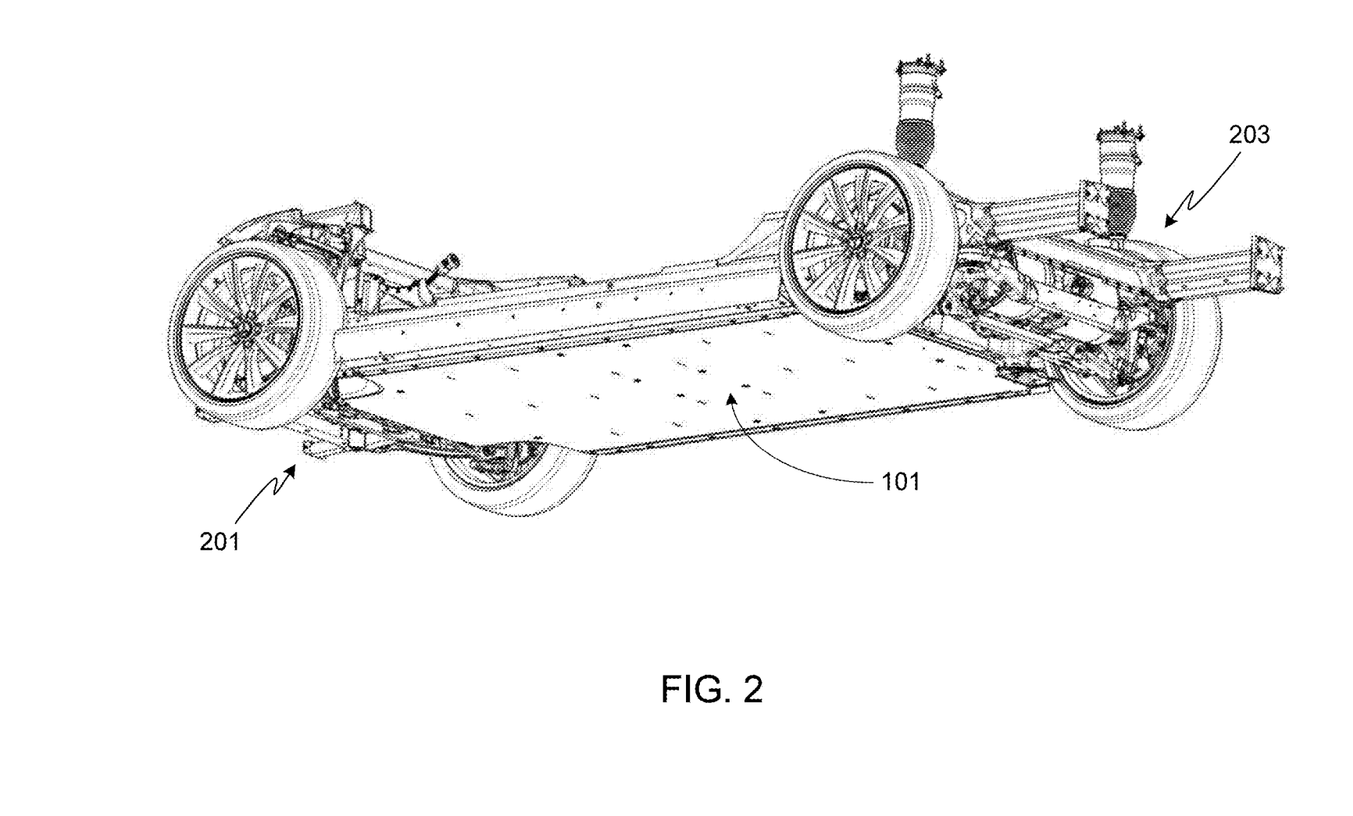
FIG. 2 provides a perspective view of a vehicle's undercarriage with the battery pack incorporated into the vehicle structure.
Figure 3:
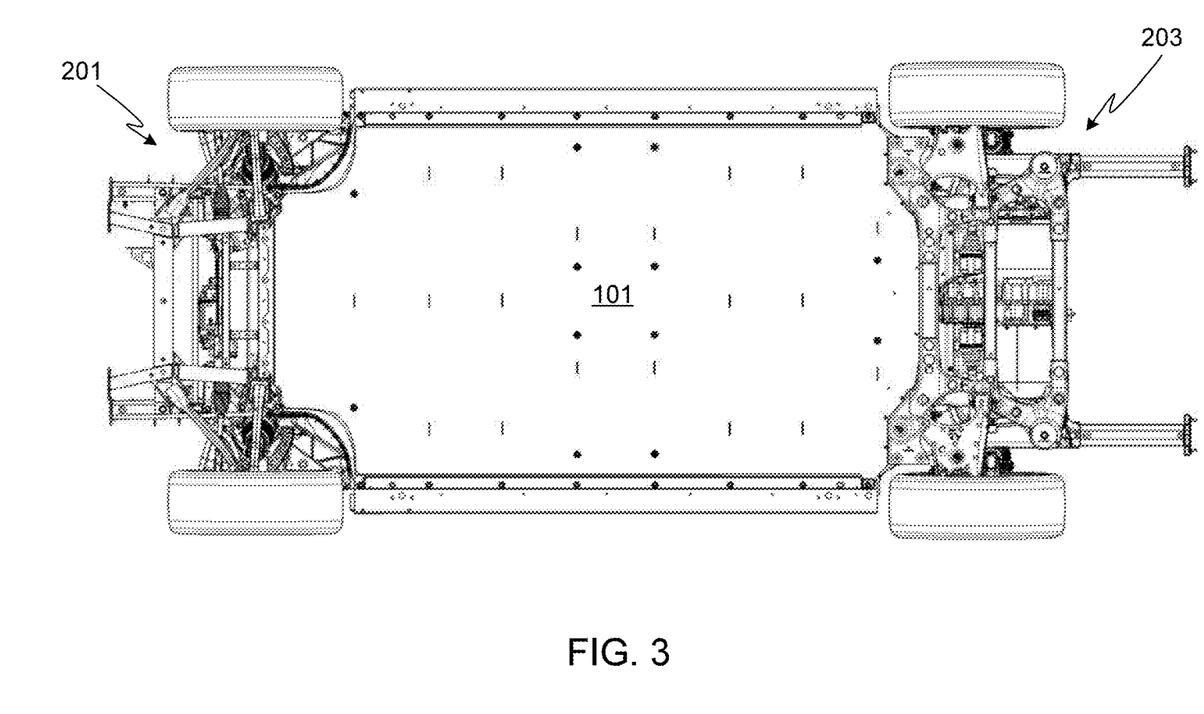
FIG. 3 provides a simplified bottom view of an electric vehicle with a battery pack incorporated into the vehicle structure.

In accordance with the present invention, and as illustrated in FIGS. 1-3, a battery pack 101 is mounted under the floor panel of an electric vehicle 100. Preferably the battery pack is integrated within the vehicle's structural frame, thus utilizing the battery pack's inherent rigidity and strength to enhance the overall performance and impact resistance of vehicle 100. In the illustrated embodiment, battery pack 101 not only transverses the width of the vehicle, i.e., from rocker panel to rocker panel, but also extends most of the distance between the front suspension 201 and the rear suspension 203. It will be appreciated that while smaller battery packs mounted under the vehicle's floor panel(s) may be used with the invention, such smaller packs will typically not provide the same level of vehicle performance enhancement as that provided by the preferred battery pack. In the illustrated embodiment, battery pack 101 is approximately 2.7 meters long and 1.5 meters wide and has a thickness that varies between approximately 0.1 meters to 0.18 meters, the thicker dimension applicable to those portions of the battery pack in which battery modules are stacked one on top of another.

Figure 4:
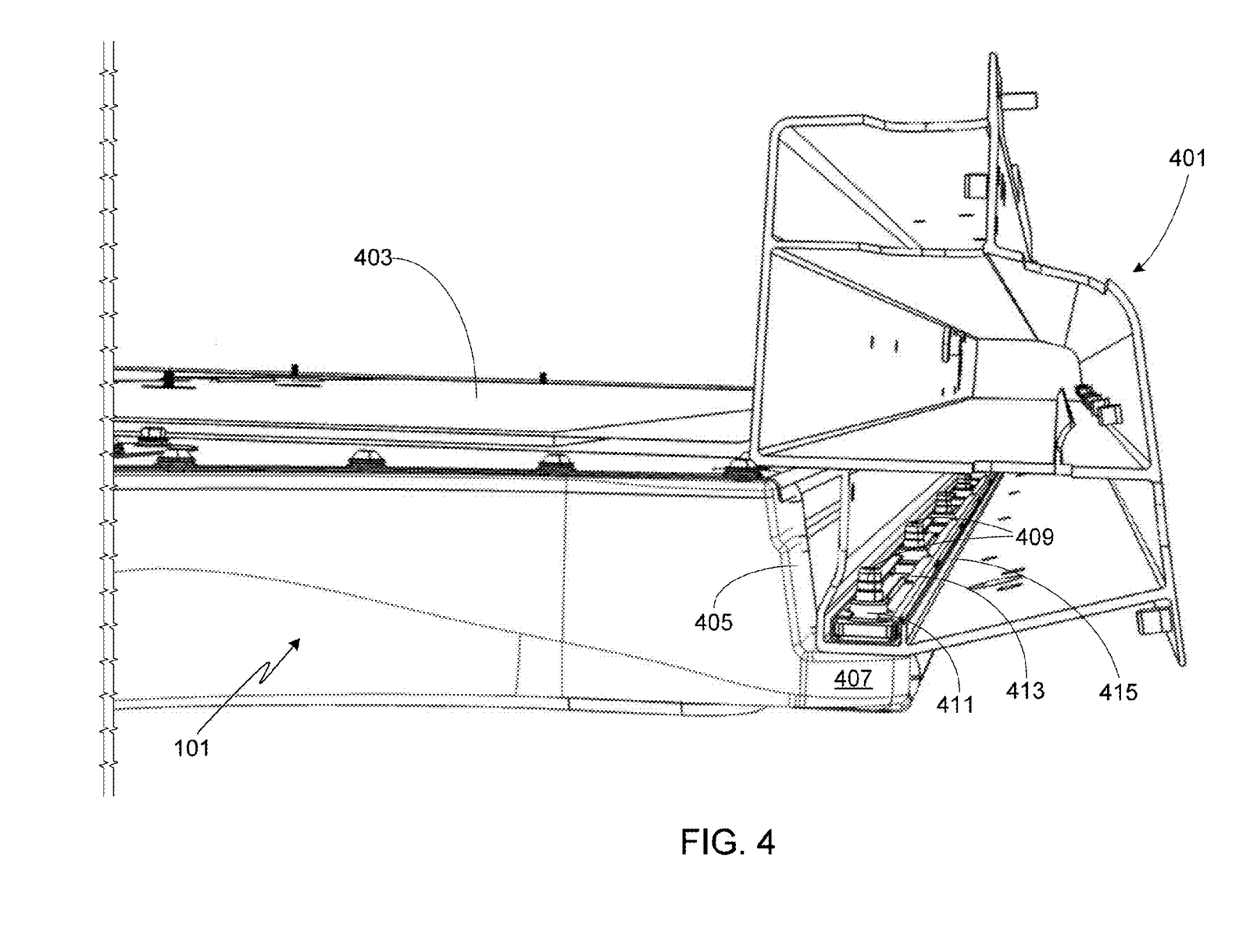
FIG. 4 provides a perspective view of a battery pack to rocker panel assembly.

As noted above, preferably battery pack 101 is configured to transverse the width of the vehicle and be coupled to the rocker panels located on either side of the vehicle. FIG. 4 illustrates the preferred approach for attaching battery pack 101 to a rocker 401, this figure showing the location of battery pack 101 under vehicle floor panel 403. Preferably rocker 401 is extruded, for example using an aluminum or aluminum alloy extrusion as described in detail in co-pending U.S. patent application Ser. No. 13/308,206, filed 30 Nov. 2011, and attached to the battery as described in co-pending U.S. patent application Ser. No. 13/308,300, filed 30 Nov. 2011, the disclosures of which are incorporated herein for any and all purposes. In general and as illustrated for the preferred embodiment, battery pack enclosure 101 includes side members 405 that include an extended mounting flange, or region, 407 that is positioned under rocker 401. Region 407 is perforated in order to allow passage of a plurality of mounting bolts 409. Mounting bolts 409, in combination with nuts 411, mechanically couple extended region 407 of battery pack 101 to rocker 401. To simplify assembly, channel nuts 411 are held in place during vehicle assembly using a channel nut retainer 413. Retainer 413 is positioned within rocker 401 using internal feature 415, thereby simplifying vehicle assembly and reducing manufacturing costs. It will be understood that other techniques may be used to mount the battery pack under the vehicle's floor panel.

Figure 5:
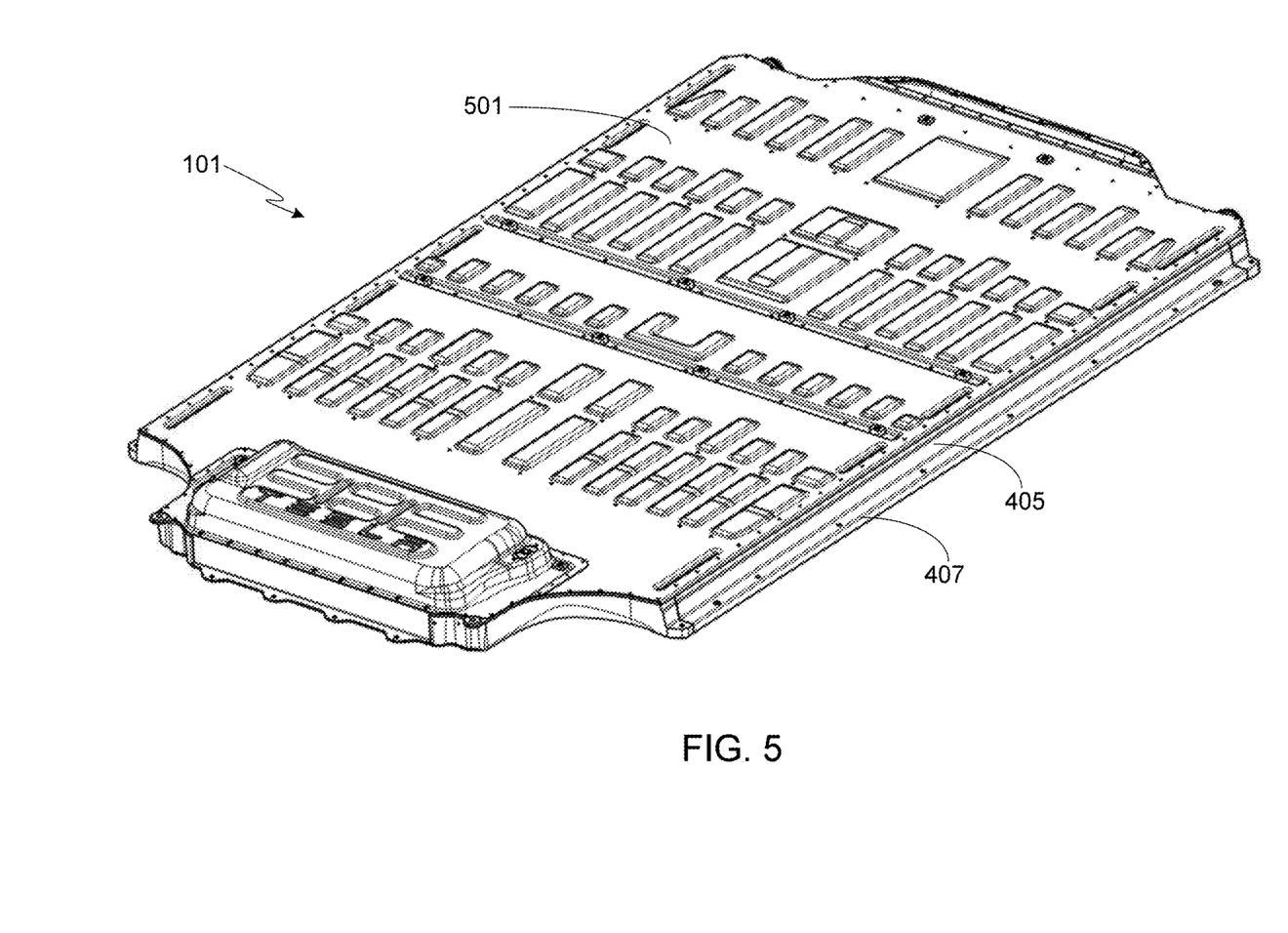
FIG. 5 provides a perspective view of the battery pack shown in FIGS. 1-4.
Figure 6:
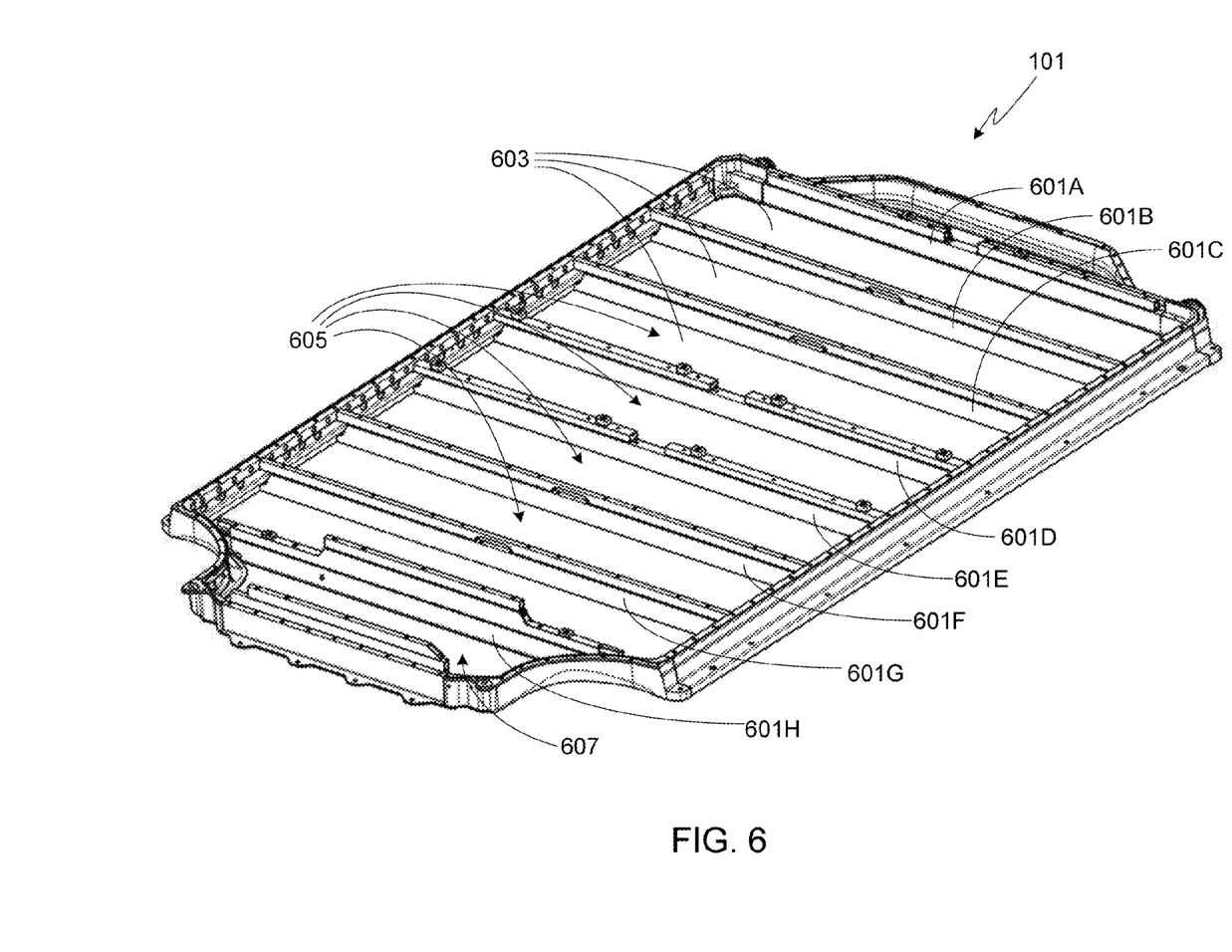
FIG. 6 provides a perspective view of the battery pack shown in FIGS. 1-5, with the top panel removed.

FIG. 5 provides a perspective view of battery pack 101 with the top battery pack enclosure panel 501 in place, panel 501 preferably providing a substantially airtight seal. Side structural elements 405, which are preferably hollow or include multiple cavities, are also visible as is battery pack mounting flange 407 that is used to mechanically and thermally couple the battery pack enclosure to the vehicle structure (not shown in this figure). FIG. 6 shows battery pack 101 with top enclosure member 501 removed, this view showing multiple cross-members 601A-601H. The number of cross-members is based on the number of batteries/battery modules that are to be encased within the battery pack as well as the desired structural characteristics of the battery pack. Preferably battery pack side members 405, including extended regions 407, battery pack top panel 501, battery pack bottom panel 603 and cross-members 601A-601H are each fabricated from a light weight metal, such as aluminum or an aluminum alloy, although other materials such as steel may be used for some or all of the battery pack components. Bottom panel 603 may be welded, brazed, soldered, bonded or otherwise attached to side members 405, with the resultant joint between panel 603 and member 405 preferably being substantially air-tight as well as being strong enough to allow bottom panel 603 to support the batteries contained within the pack. Top panel 501 is typically attached to members 405 using bolts or similar means, thus simplifying battery replacement as well as allowing battery interconnects, battery pack components, cooling system components and other battery pack components to be repaired and/or replaced.

Cross-members 601A-601H provide several benefits. First and foremost, cross-members 601A-601H provide mechanical and structural strength and rigidity to the battery pack and to the vehicle to which the battery pack is attached. Additionally, cross-members 601A-601H help to segregate thermal events by providing a thermal barrier between groups of batteries as well as minimizing gas flow between sections 605, sections 605 being defined by the cross-members, side members 405, top member 501 and bottom member 603. By segregating thermal events within smaller groups of batteries, thermal runaway propagation is limited as is the potential for battery pack damage.

Figure 7:
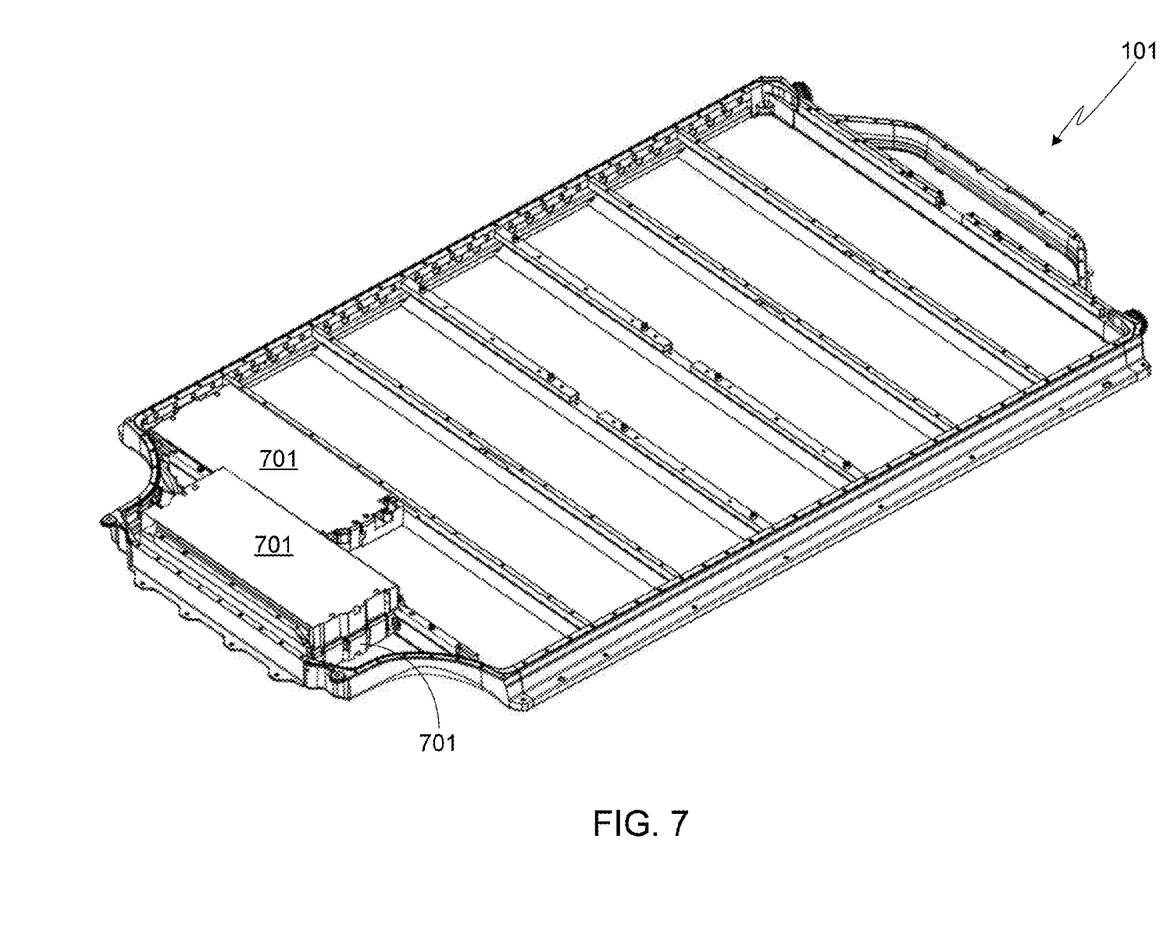
FIG. 7 provides a perspective view of the battery pack shown in FIGS. 1-6, this view showing three of the battery modules in place within the pack.

FIG. 7 shows a similar view to that provided by FIG. 6, with the inclusion of a couple of battery modules 701. In this illustration, a single module 701 is shown positioned within one of the seven, larger sections 605 of battery pack 101. Note that in the illustrated embodiment, each large section 605 is designed to house a pair of battery pack modules 701. Additionally, in this illustration there are two modules 701 stacked one on top of the other in the front section 607 of pack 101. Note that in the preferred embodiment, each module 701 contains 370 individual batteries, each battery utilizing an 18650 form factor. It should be understood, however, that this configuration is only exemplary of a preferred embodiment and that the invention is equally applicable to other configurations, for example utilizing batteries with a different form factor, a larger or smaller number of batteries, individual batteries versus modules, different battery chemistries, etc.

Figure 8:
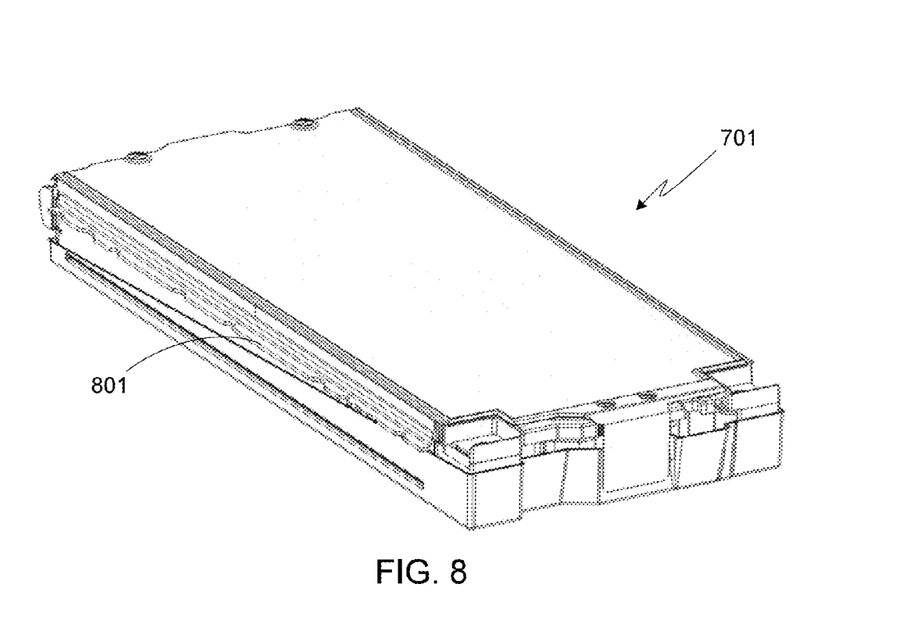
FIG. 8 provides a perspective views of a single battery module for use within the battery pack shown in FIGS. 1-7.
Figure 9:
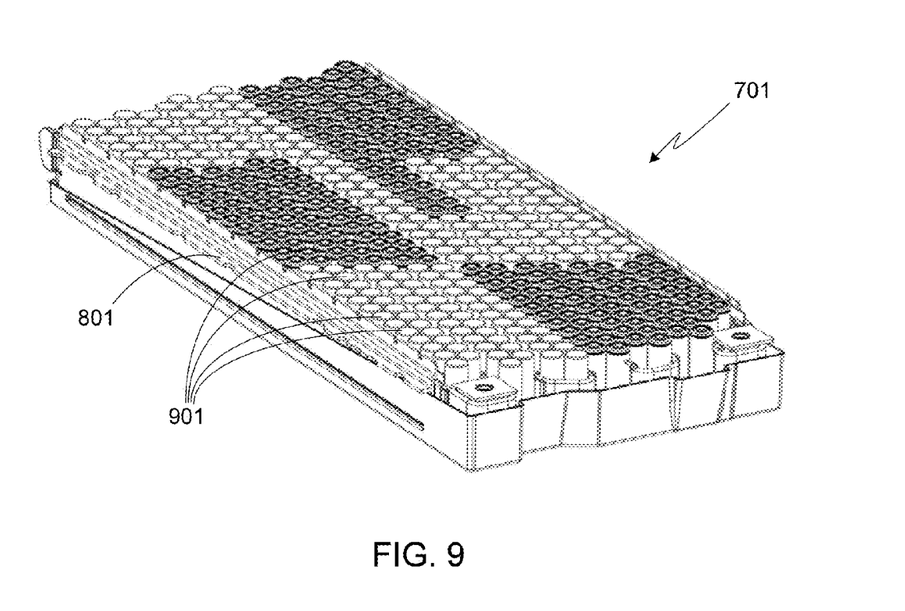
FIG. 9 illustrates the battery module shown in FIG. 8 with the upper module components removed.
Figure 10:
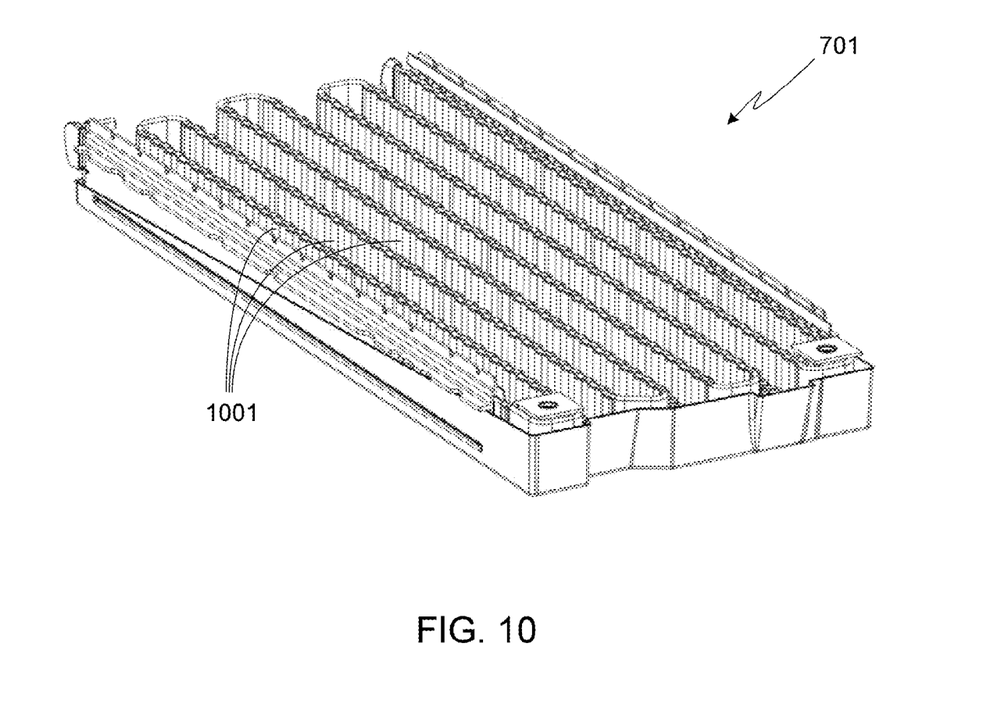
FIG. 10 illustrates the battery module shown in FIGS. 8 and 9 with the cells removed.

As noted above, the present invention does not rely on a particular implementation of the battery pack enclosure and more specifically, does not rely on a particular implementation of the batteries and battery modules that are contained within the battery pack enclosure. Specific implementations of both are only provided herein to illustrate one preferred configuration. FIG. 8 provides a perspective view of a single module 701, this view highlighting the module mounting flange 801. In this configuration, mounting flanges 801 are located on either side of the module and, during battery pack assembly, are captured between upper and lower sections of each cross-member. FIG. 9 shows the previously illustrated battery module with the upper portion of module 701 removed as well as several of the upper module components (e.g., battery locator plate, current collector plate, etc.), thus making the individual batteries 901 visible. Note that the orientation of cells 901 within module 701 varies. FIG. 10 provides a similar view to that of FIG. 9, with the exception that batteries 901 have been removed. With the removal of batteries 901, the cooling conduits 1001 are visible, conduits 1001 being coupled to the battery pack thermal management system (not shown).

Figure 11:
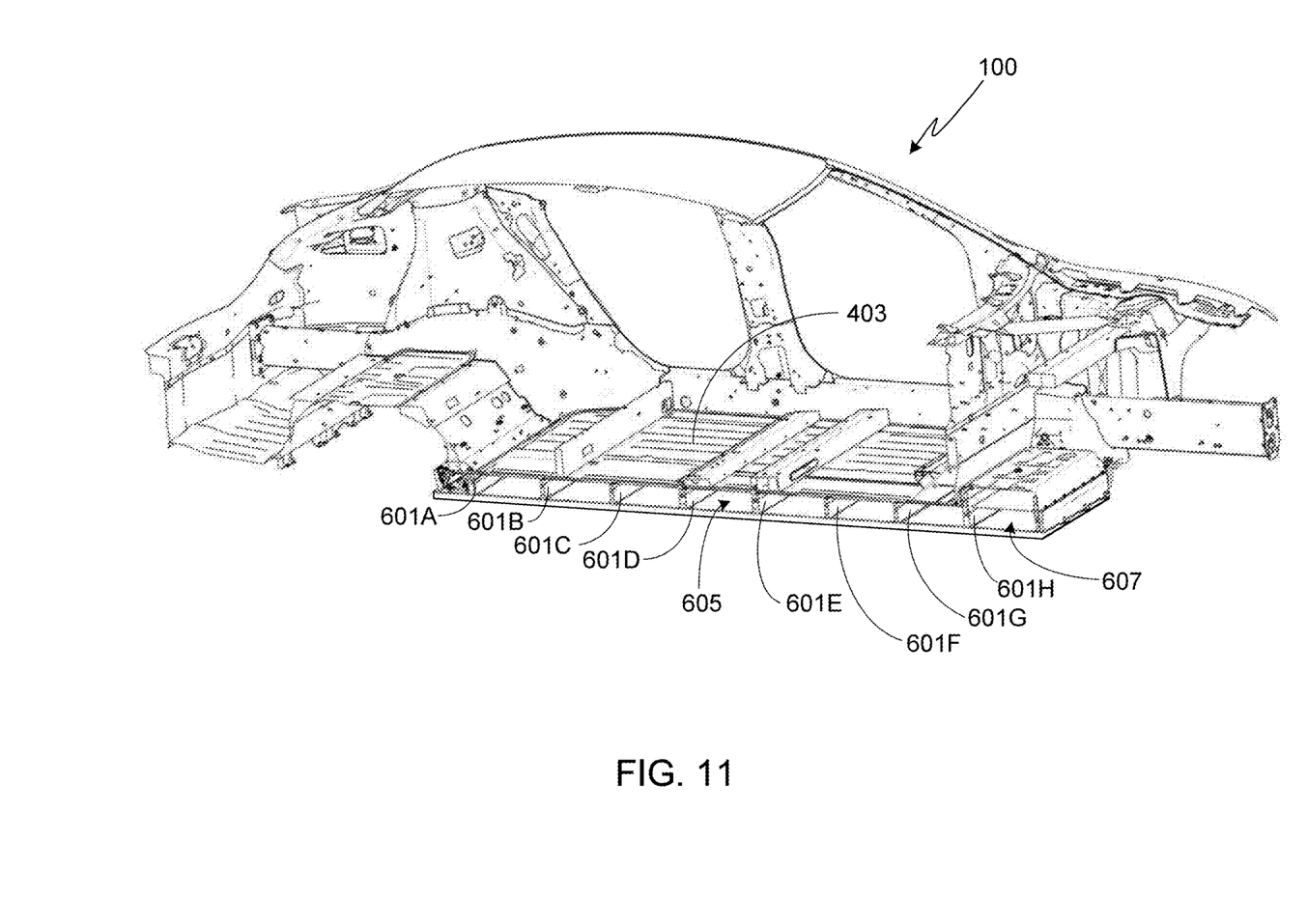
FIG. 11 provides a perspective, cross-sectional view of the battery pack shown in FIGS. 1-7 mounted under the floor panel of the vehicle shown in FIG. 1.

FIG. 11 provides a perspective, cross-sectional view of battery pack 101 mounted under floor panel 403 of vehicle 100. This view also provides additional views of the cross-members. Note that in this figure the batteries/battery modules are not shown within the battery pack, thus simplifying the figure in order to better illustrate the basic battery pack/vehicle assembly.

As shown in the cross-sectional view of FIG. 11, preferably cross-members 601A-601H do not utilize the same cross-section; rather the cross-section of each is optimized for that particular member's location within the pack. In general, cross-members 601A-601H may either be comprised of a single unit or as preferred, comprised of an upper section and a lower section, thus providing a convenient means of capturing and mounting the battery modules 701. One or both sections of each cross-member may be hollow, thus minimizing weight while still providing a rigid and strong structural member. It should be understood that not only can the configuration/design of the cross-members vary, depending upon their location within the pack, so can the materials comprising the cross-members. Therefore while cross-members 601A-601H are preferably fabricated from aluminum or an aluminum alloy, for example using an extrusion process, other materials (e.g., steel, ceramics, etc.) may also be used if such materials fit both the mechanical and thermal goals for the particular cross-member in question. Additionally, the lumens within one or more of the cross-members may be unfilled or filled, for example filled with a high melting temperature, low thermal conductivity material (e.g., fiberglass or similar material). Alternately, the lumens within the cross-members may include a liquid (e.g., water), the liquid being either stagnant or flowing. If stagnant, the liquid may be contained within the lumens themselves or, as preferred, contained within pouches that fit within the cavities. If the liquid is flowing, it is preferably contained within tubing that is inserted within the cross-member cavities and either coupled to a battery cooling system or used in a stand-alone circulation system.

Preferably and as illustrated in FIG. 11, cross-members 601D and 601E are larger than the other central cross-members. The reason for the increased size for these particular cross-members is to provide additional cross-member strength at those locations that are most critical to resisting side impact loads that may be encountered during a collision.

Figure 12:
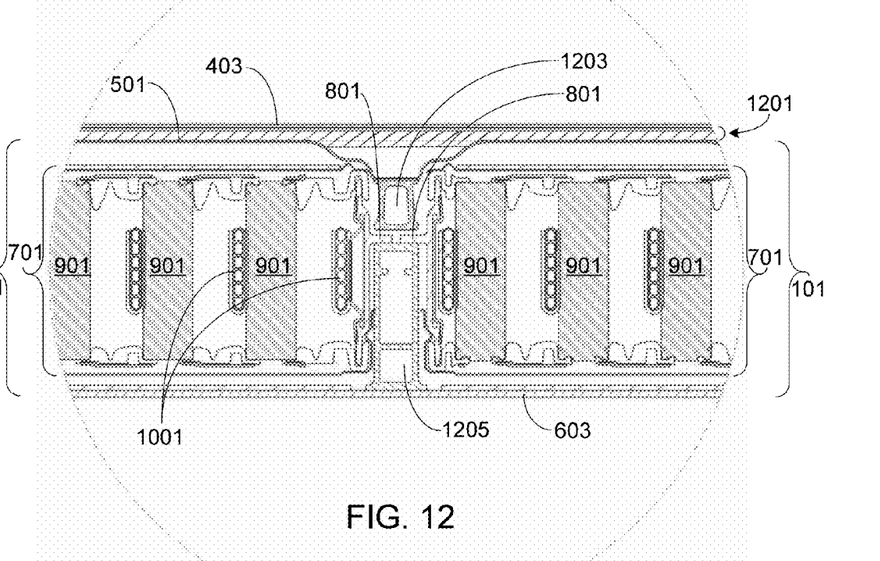
FIG. 12 provides a detailed cross-sectional view of a portion of the battery pack along with the thermal barrier located between the battery pack enclosure and the vehicle floor panel.
Figure 13:
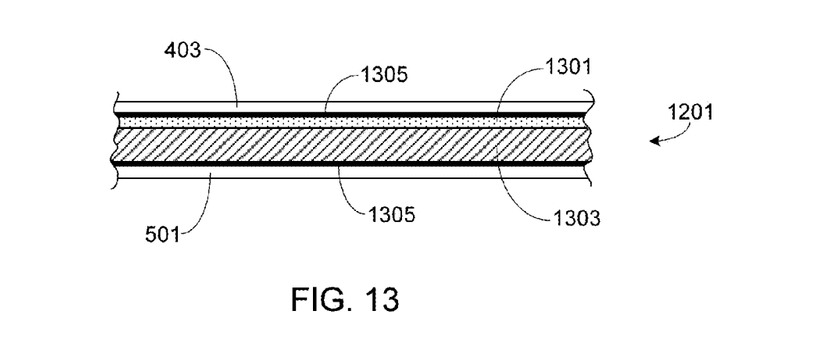
FIG. 13 provides a detailed cross-sectional view of the thermal barrier layer interposed between the battery pack enclosure top panel and the vehicle floor panel.

FIG. 12 provides a cross-sectional view of the battery pack assembly, this view showing the multi-layer thermal barrier 1201 interposed between the upper surface 501 of battery pack 101 and the vehicle floor panel 403. FIG. 13 provides a detailed cross-sectional view of multi-layer thermal barrier 1201. Note that due to the plane used for purposes of the cross-sectional view of FIG. 12, and due to the staggering of batteries in the preferred embodiment as illustrated in FIG. 9, the cells mounted to the left side of each cooling conduit 1001 are not visible in this figure. As shown, in this configuration the module mounting flanges 801 are captured between cross-member upper section 1203 and cross-member lower section 1205, the upper and lower sections providing a simple means of locating and holding the module in place within the battery pack.

Barrier 1201 is a multi-purpose, multi-layer design that dramatically enhances passenger comfort and safety by providing a thermal barrier between battery pack 101 and floor panel 403, and therefore between battery pack 101 and the passenger compartment. Additionally, multi-layer barrier 1201 helps to isolate the passenger cabin from exterior noise as well as damping vibrations that might otherwise pass into the passenger cabin.

While the bulk of the battery pack enclosure, including the various components within the battery pack, help to isolate the passenger compartment from road noise and other external noises, it will be appreciated that many noises pass through, or are transmitted by, battery pack 101. Accordingly, in the preferred embodiment multi-layer barrier 1201 is used to prevent noise intrusion into and through vehicle flooring 403. Preferably multi-layer barrier 1201 provides an acoustic insertion loss for frequencies above 1000 Hz in general, and for frequencies between 1000 Hz and 10 kHz in particular, of greater than 10 dB, and more preferably greater than 20 dB. In addition to providing sound isolation, preferably multi-layer barrier 1201 also provides vibration damping and has a damping loss factor of at least 0.1 (10%), more preferably at least 0.25 (25%), still more preferably at least 0.3 (30%), and yet still more preferably at least 0.4 (40%).

Most importantly, multi-layer barrier 1201 provides thermal isolation, specifically isolating the passenger cabin from heat generated by the batteries within battery pack 101 and helping to insure that the batteries are allowed to operate within the preferred temperature range regardless of the temperature within the passenger cabin. Preferably multi-layer barrier 1201 is designed to isolate the passenger cabin during normal vehicle operation, thus insuring passenger comfort, and in the event of the occurrence of thermal runaway within the pack, thus insuring passenger safety. In a preferred embodiment, multi-layer barrier 1201 exhibits low thermal conductivity while being resistant to high temperatures. For example, in one embodiment and at a temperature of 1000° C., multi-layer barrier 1201 has a thermal conductivity of less than 0.25 W/m-K, preferably less than 0.2 W/m-K, more preferably less than 0.15 W/m-K, and still more preferably less than 0.1 W/m-K. In one embodiment multi-layer barrier 1201 is capable of withstanding temperatures of more than 500° C. continuously, preferably capable of withstanding temperatures of more than 750° C. continuously and/or withstanding temperatures of more than 1000° C. for a period of at least 10 seconds, more preferably capable of withstanding temperatures of more than 900° C. continuously and/or withstanding temperatures of more than 1000° C. for a period of at least 10 seconds, and still more preferably capable of withstanding temperatures of more than 1000° C. continuously and/or withstanding temperatures of more than 1400° C. for a period of at least 1 second.

In order to meet the goals stated above, especially insertion and damping loss, the inventors have found that multi-layer barrier 1201 must be compressed, preferably on the order of 30%. Additionally, by compressing multi-layer barrier 1201, a strong mechanical coupling between floor panel 403 and the rigid battery pack structure is achieved, allowing the rigidity of the battery pack enclosure to augment the stiffness of the floor panel, thereby providing a stiffer flooring for the passenger cabin than would otherwise be achieved for the same thickness floor panel. In at least one embodiment, multi-layer barrier 1201 is approximately 9 millimeters thick pre-compression, and is compressed down to approximately 6 millimeters when the battery pack 101 is mounted to the vehicle's underbody. For this amount of compression, the compression modulus of the materials comprising the multi-layer barrier 1201 must be low enough to allow it to "flow" into all of the features of the vehicle's floor panel 403 and top panel 501 of the battery pack. In addition, relatively soft materials are needed to allow for assembly since even a low modulus material can exert a large force during compression given the very large surface area of battery pack 101 in the preferred embodiment. Accordingly, a compression modulus of 1.5 PSI at 25% compression is preferred, this value typically referred to as the material's CLD (i.e., compression load deflection).

In the preferred embodiment, multi-layer barrier 1201 includes a layer of a highly compressible and conformable elastic material 1301 and a layer of a pliable and conformable thermally insulating material 1303. As shown, preferably elastic material layer 1301 is closer to the underside of floor panel 403 while thermally insulating material layer 1303 is closer to the battery pack top panel 501. In an exemplary embodiment, layer 1301 is approximately 3 millimeters thick and comprised of closed cell ethylene propylene diene monomer (EPDM) foam that exhibits minimal permanent set. Other materials that may be used include a variety of polyurethane and polyethylene foams. In this same exemplary embodiment, layer 1303 is approximately 6 millimeters thick and comprised of a compressible ceramic fiber sheet, for example one fabricated from a weave of silica and calcium oxide fibers held together with a binder (e.g., an organic binder) or a weave of silica, calcium oxide and magnesium oxide fibers held together with a binder. Alternate exemplary materials suitable to fabricate layer 1303 include a basalt fiber based needled pad, silica/silica fibers, alumina, Kevlar® and Nomex®.

Figure 14:
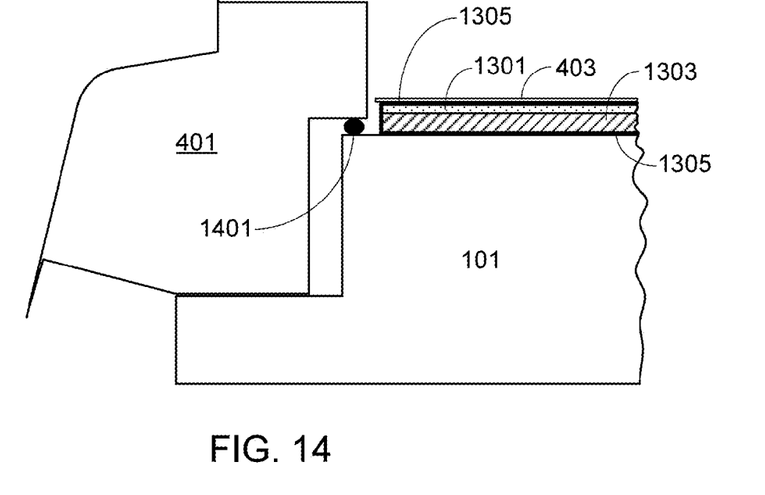
FIG. 14 illustrates a configuration in which the battery pack is sealed to the vehicle, thereby capturing the multi-layer barrier between the battery pack and the vehicle flooring.
Figure 15:
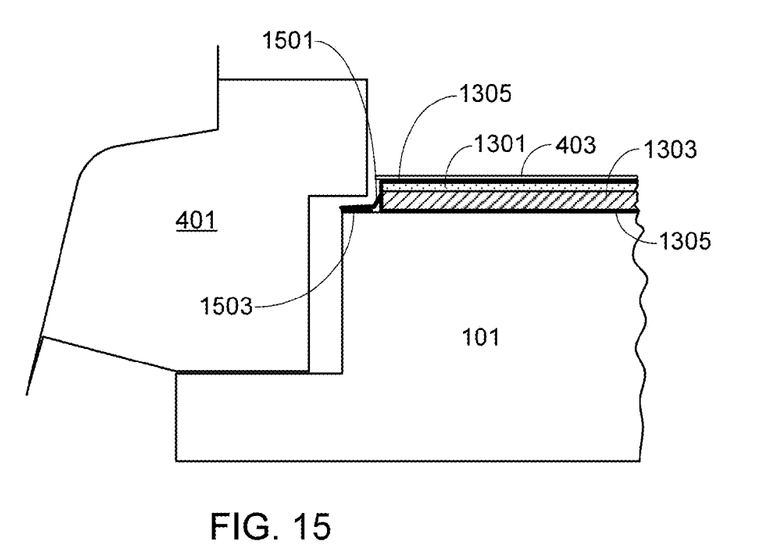
FIG. 15 illustrates a configuration in which the outer layer of the multi-layer barrier is bonded directly to the battery pack, for example along the edge of the barrier layer and the perimeter of the battery pack.

In addition to providing a thermal and sound barrier, in the preferred embodiment multi-layer barrier 1201 also includes a moisture barrier layer 1305 that surrounds layers 1301/1303. Preferably barrier layer 1305 is fabricated from a plastic, for example a low-density polyethylene (LDPE) thermoplastic, and is in the form of a bag that encases layers 1301/1303. In this configuration, layer 1305 helps to prevent water from accumulating within layers 1301/1303. Additionally, by sealing the multi-layer barrier 1201 to the top of the battery pack, water can be prevented from pooling in any of the depressions located on the top surface of enclosure top panel 501 (see FIG. 5). FIGS. 14 and 15 illustrate two preferred approaches for preventing water accumulation on the top of the battery pack enclosure using barrier 1201. In the cross-sectional view shown in FIG. 14, battery pack 101 is sealed to the vehicle using water proof seal 1401 (e.g., an o-ring), thereby capturing the multi-layer barrier 1201 between the battery pack and the vehicle flooring. While this approach typically prevents water from reaching the top surface of the battery pack, the inventors have found that a better seal is achieved by sealing the multi-layer barrier 1201 directly to the top of the battery pack, for example as illustrated in FIG. 15. In this configuration, an edge 1501 of layer 1305 extends away from barrier 1201, providing a surface that can be bonded directly to the perimeter of battery pack 101 using a sealant 1503 (e.g., a butyl rubber sealant formulated to adhere to both the plastic comprising barrier layer 1305 and the metal comprising top panel 501 and/or side enclosure members 405).

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

The invention claimed is:

1. A vehicle battery pack integrated assembly, comprising:
    a battery pack enclosure mounted under an electric vehicle, wherein said battery pack enclosure comprises an enclosure top panel, an enclosure bottom panel, and a plurality of enclosure side members, wherein said battery pack enclosure is configured to hold a plurality of batteries, and wherein said battery pack enclosure is mounted between a passenger cabin floor panel and a driving surface; and
    a multi-layer thermal barrier interposed between said battery pack enclosure and said passenger cabin floor panel, wherein said multi-layer thermal barrier provides noise isolation, thermal isolation and vibration damping, wherein said multi-layer thermal barrier is compressed when said battery pack enclosure is mounted to said electric vehicle, and wherein said multi-layer thermal barrier is comprised of:
        a first layer, wherein said first layer is comprised of a compressible and conformable elastic material; and
        a second layer, wherein said second layer is comprised of a conformable thermally insulating material.

2. The vehicle battery pack integrated assembly of claim 1, wherein said multi-layer thermal barrier has an acoustic insertion loss of greater than 10 dB for frequencies between 1000 Hz and 10 kHz.

3. The vehicle battery pack integrated assembly of claim 1, wherein said multi-layer thermal barrier has an acoustic insertion loss of greater than 20 dB for frequencies between 1000 Hz and 10 kHz.

4. The vehicle battery pack integrated assembly of claim 1, wherein said multi-layer thermal barrier has a damping loss factor of at least 0.1.

5. The vehicle battery pack integrated assembly of claim 1, wherein said multi-layer thermal barrier has a damping loss factor of at least 0.3.

6. The vehicle battery pack integrated assembly of claim 1, wherein said second layer of said multi-layer thermal barrier has a thermal conductivity of less than 0.25 W/m-K at a temperature of 1000° C.

7. The vehicle battery pack integrated assembly of claim 1, wherein said second layer of said multi-layer thermal barrier has a thermal conductivity of less than 0.15 W/m-K at a temperature of 1000° C.

8. The vehicle battery pack integrated assembly of claim 1, wherein said second layer of said multi-layer thermal barrier has a thermal conductivity of less than 0.1 W/m-K at a temperature of 1000° C.

9. The vehicle battery pack integrated assembly of claim 1, wherein said second layer of said multi-layer thermal barrier is capable of withstanding temperatures of more than 1000° C. continuously.

10. The vehicle battery pack integrated assembly of claim 1, wherein said second layer of said multi-layer thermal barrier is capable of withstanding temperatures of more than 1000° C. for a period of at least 10 seconds.

11. The vehicle battery pack integrated assembly of claim 1, wherein said first layer of said multi-layer thermal barrier has a compression modulus of at least 1.5 PSI at 25% compression.

12. The vehicle battery pack integrated assembly of claim 1, wherein said second layer of said multi-layer thermal barrier has a compression modulus of at least 1.5 PSI at 25% compression.

13. The vehicle battery pack integrated assembly of claim 1, wherein said first layer of said multi-layer thermal barrier is comprised of a closed cell foam material, wherein said closed cell foam material consists of a material selected from the group consisting of polyurethane, polyethylene, and ethylene propylene diene monomer (EPDM) foam.

14. The vehicle battery pack integrated assembly of claim 1, wherein said second layer of said multi-layer thermal barrier is comprised of a material selected from the group consisting of silica/calcium oxide fibers, silica/calcium oxide/magnesium oxide fibers, basalt fiber based needled pad, silica/silica fibers, alumina, Kevlar®, and Nomex®.

15. The vehicle battery pack integrated assembly of claim 1, said multi-layer thermal barrier further comprising a moisture barrier layer that encases said first and second layers of said multi-layer thermal barrier.

16. The vehicle battery pack integrated assembly of claim 15, wherein said moisture barrier layer of said multi-layer thermal barrier is fabricated from a plastic material.

17. The vehicle battery pack integrated assembly of claim 15, wherein said moisture barrier layer of said multi-layer thermal barrier is fabricated from a low-density polyethylene (LDPE) thermoplastic.

18. The vehicle battery pack integrated assembly of claim 15, further comprising a sealant that seals and bonds said moisture barrier layer of said multi-layer thermal barrier to a perimeter of said battery pack enclosure.

19. The vehicle battery pack integrated assembly of claim 1, further comprising a water proof seal interposed between said battery pack enclosure and said electric vehicle.

20. The vehicle battery pack integrated assembly of claim 19, wherein said multi-layer thermal barrier is sealed between said battery pack enclosure and said passenger cabin floor panel by said water proof seal.

* * * * *